Figure 1:
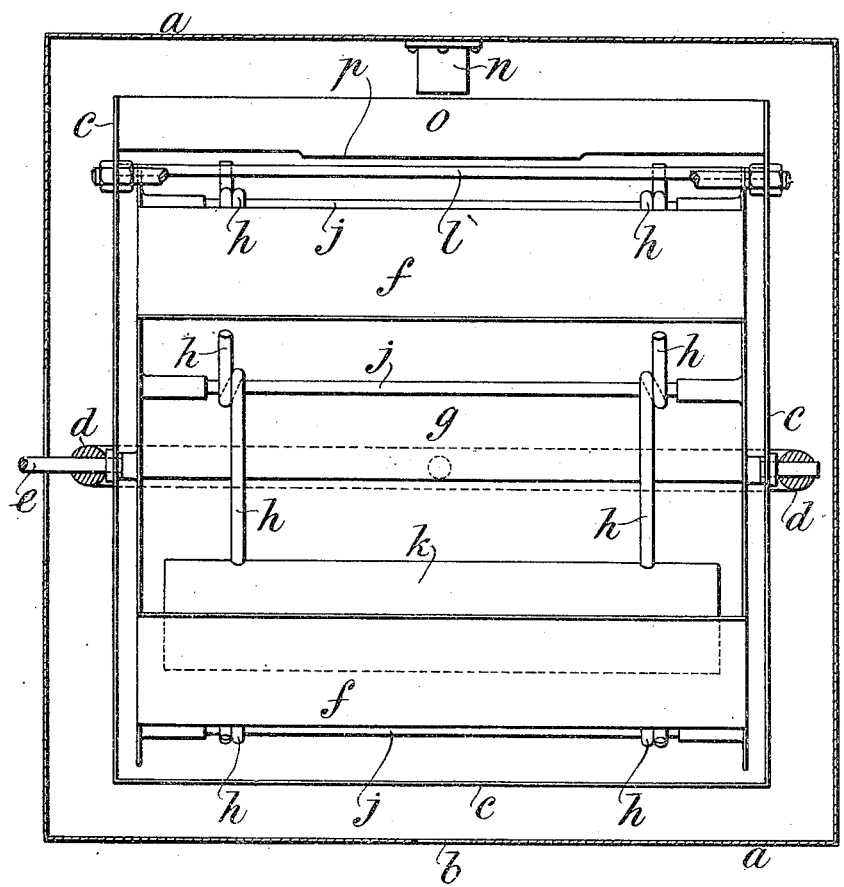

E. S. DONISTHORPE.
APPARATUS FOR MEASURING LIQUIDS.
APPLICATION FILED JULY 13, 1908. RENEWED JAN. 10, 1910.

951,941.

Patented Mar. 15, 1910.

6 SHEETS—SHEET 1.

Witnesses.
M. L. Adams
E. B. Franzoni

Inventor.
E. S. Donisthorpe,
By his Attorneys,
Baldwin & Wight.

E. S. DONISTHORPE.
APPARATUS FOR MEASURING LIQUIDS.
APPLICATION FILED JULY 13, 1908. RENEWED JAN. 10, 1910.

951,941.

Patented Mar. 15, 1910.
6 SHEETS—SHEET 6.

Witnesses
M. L. Adams.
C. B. Frangon.

Inventor.
E. S. Donisthorpe,
By his Attorneys,
Baldwin & Wight.

UNITED STATES PATENT OFFICE.

EDMUND SEAL DONISTHORPE, OF HINDHEAD, ENGLAND.

APPARATUS FOR MEASURING LIQUIDS.

951,941.  Specification of Letters Patent.  Patented Mar. 15, 1910.

Application filed July 13, 1908, Serial No. 443,318. Renewed January 10, 1910. Serial No. 537,348.

*To all whom it may concern:*

Be it known that I, EDMUND SEAL DONISTHORPE, gentleman, a subject of the King of Great Britain, residing at Links House, Hindhead, in the county of Surrey, England, have invented new and useful Improvements in Apparatus for Measuring Liquids, of which the following is a specification.

This invention relates to improvements in apparatus for measuring liquids and is more especially applicable to measuring the amount of petrol poured into the petrol tanks of motor cars.

According to this invention a vessel is placed in communication with the orifice of the petrol tank so that all petrol entering the tank must pass through this vessel. Inside the vessel is a frame which is so mounted in gimbals that a spindle carried by it is always approximately horizontal. On the spindle is a wheel divided into two or more compartments, pivoted within each of which is a lever, or are levers, having at one end a float, the other end being so formed as to engage with a projection on the frame. The vessel is provided with an orifice from which leads a pipe situated at the top of the vessel which delivers the petrol to a receptacle mounted on the rocking frame whence it flows into one of the compartments and since the receptacle is mounted on the frame the delivery orifice of the receptacle is always in the same position relatively to the compartment beneath it. When a compartment is filled to the desired height the float rises freeing the end of the lever or levers and the wheel turns until the lever or levers of the succeeding compartment engage with the projection, the petrol in the first compartment being delivered into the tank. It is not however essential that the frame containing the measuring wheel should be mounted in gimbals, in which case the spindle may be supported by the sides of the vessel itself. The receptacle above mentioned is fixed to the top of the vessel and serves to guide the direction of flow of the liquid and prevent tampering with the measuring wheel. Alternatively instead of providing a lever or levers for each compartment one lever is provided carrying at one end a float and pivoted at the other to the frame and so situated that the float enters each compartment in turn as the wheel revolves, there being on the lever a projection or catch which engages with the wheel and prevents it turning unless the compartment is full.

On the spindle is a counting mechanism which registers the number of revolutions of the spindle and indicates the amount of petrol introduced into the tank.

The drawings illustrate apparatus made in accordance with this invention.

Figure 2:
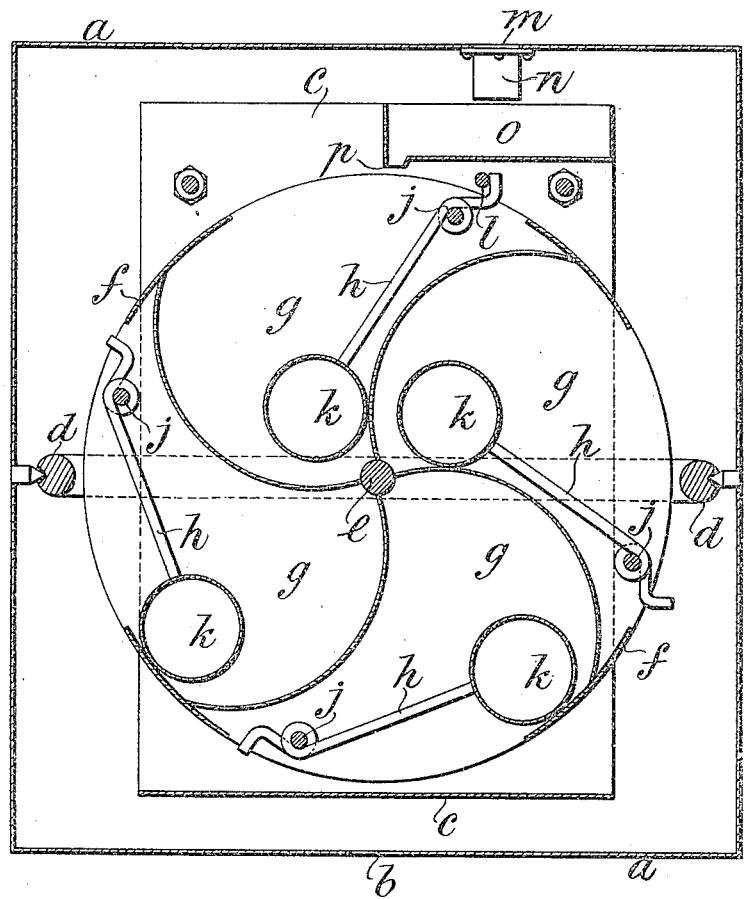
Figure 3:
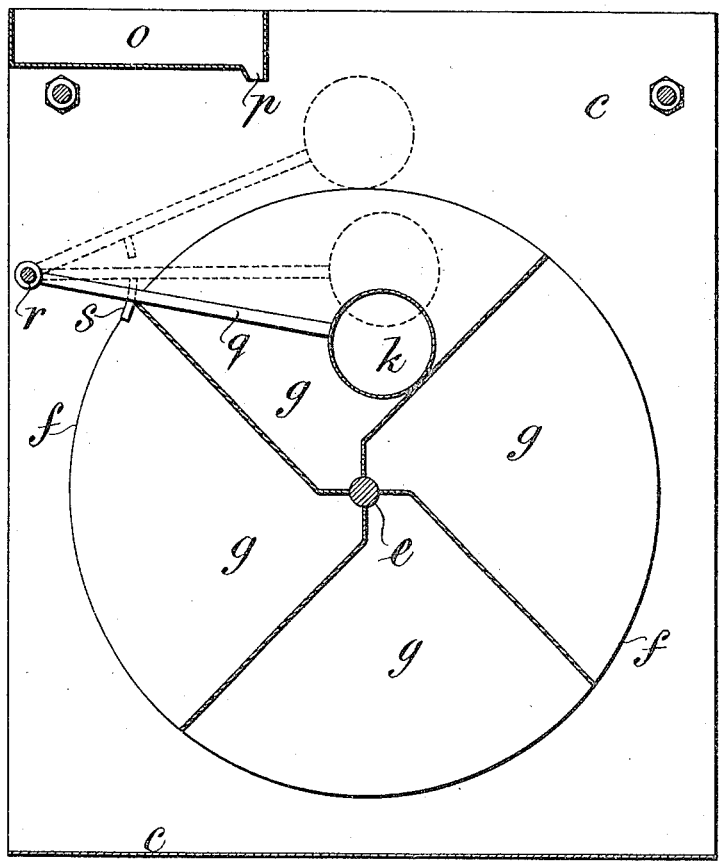
Figure 4:
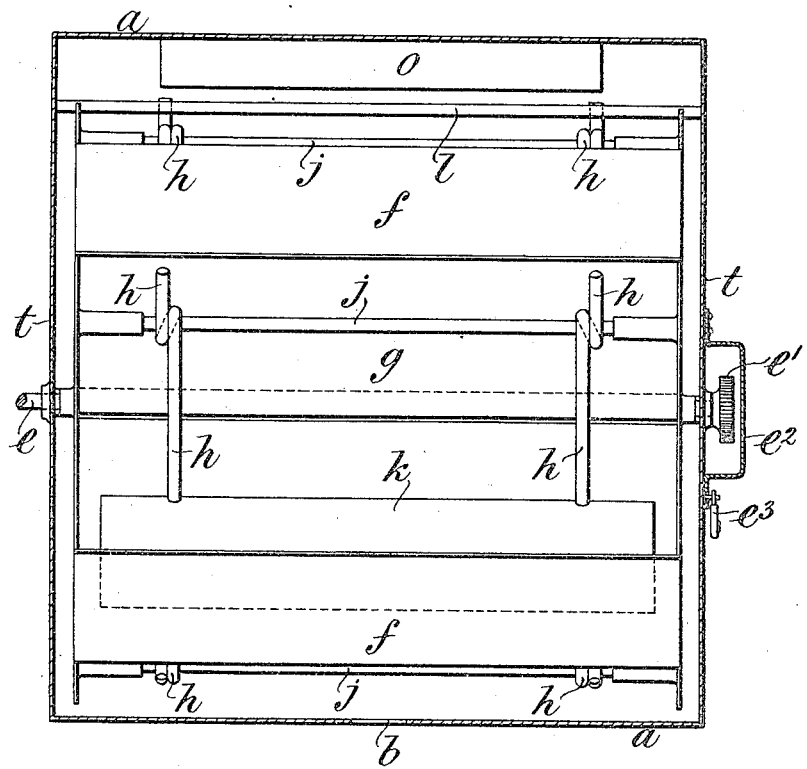
Figure 5:
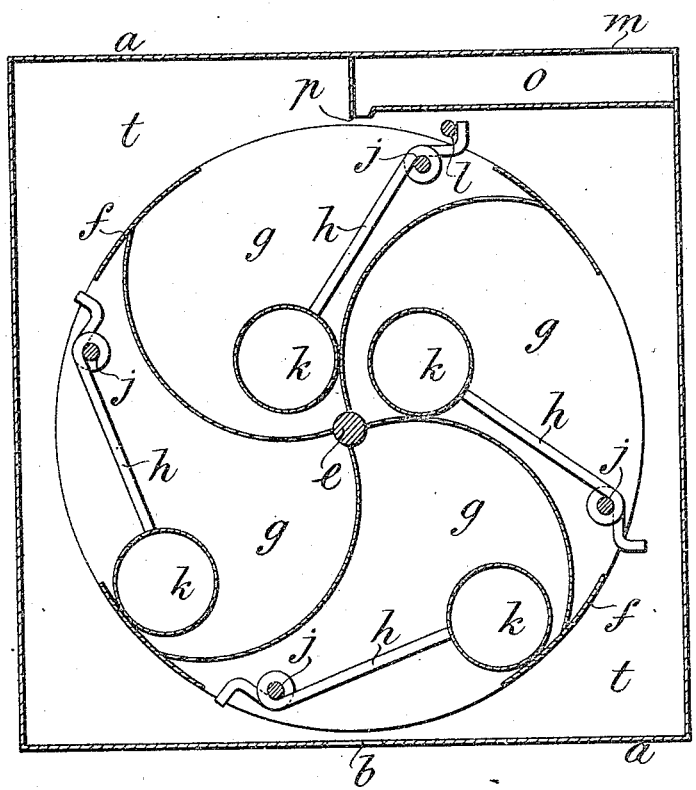
Figure 6:
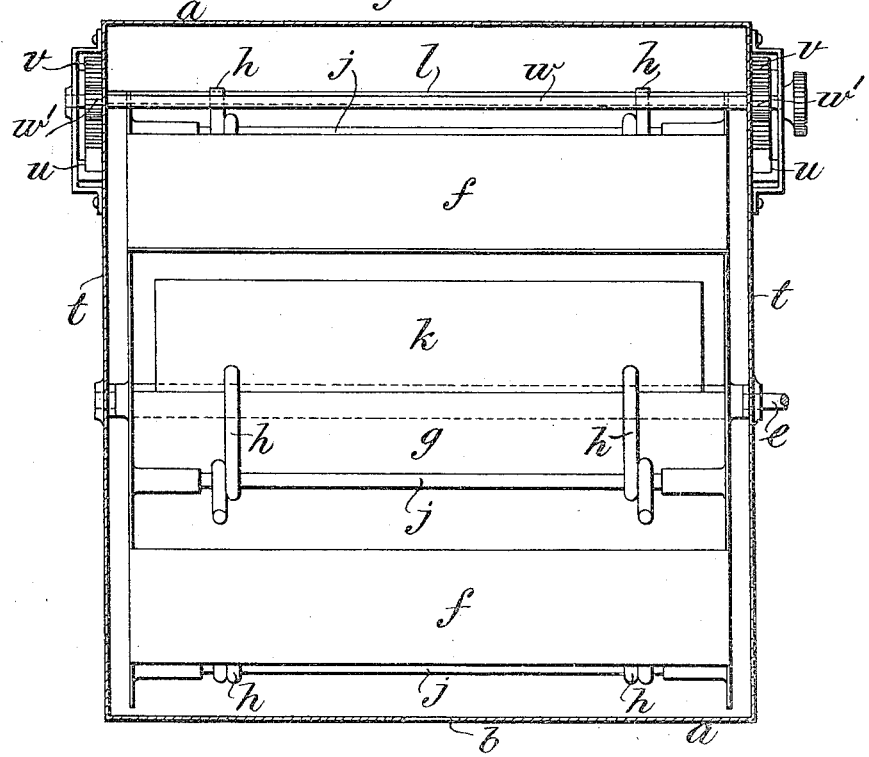
Figure 7:
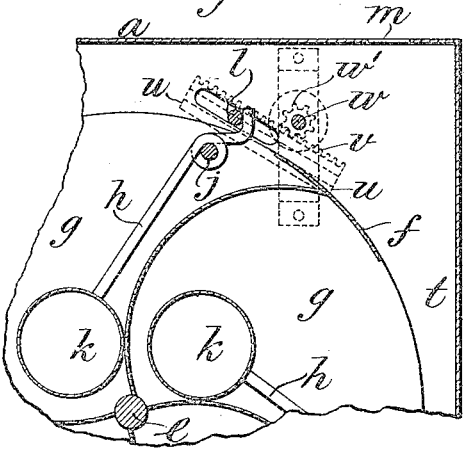

Figure 1 is a longitudinal section and Fig. 2 is a transverse section of the same. Fig. 3 illustrates an alternative arrangement. Figs. 4 and 5 are similar views to Figs. 1 and 2 the gimbals being dispensed with. Figs. 6 and 7 show means for regulating the amount of petrol that is required to run into a compartment before the float lever is freed.

$a$ is a vessel whose delivery orifice $b$ is placed in communication with the petrol tank. In the vessel $a$ is a frame $c$ mounted in gimbals $d$ and by which is carried a spindle $e$; on the spindle $e$ is a measuring wheel $f$ divided into compartments $g$. In each compartment $g$ are levers $h\ h$ pivoted to a rod $j$ and to which is attached a float $k$, the other ends, when the compartment is uppermost, engaging with a rod $l$.

The petrol is supplied through an admission orifice $m$ in the vessel $a$ from which a pipe $n$ leads to a receptacle $o$ on the frame $c$; from the receptacle $o$ the petrol passes through an opening $p$ to the uppermost compartment of the wheel.

In the arrangement shown in Fig. 3 a lever $q$ is pivoted at $r$ to the frame $c$ and the lever $q$ carries a projection $s$ which engages with the wheel $f$ and prevents it from turning.

In Figs. 4 and 5 the spindle $e$ is carried by the sides $t$ of the vessel $a$ and at one end is provided with a milled head $e'$ in order that the spindle may be turned if the wheel should be turned out of position by the movement of the motor car. A cap $e^2$ secured by a padlock $e^3$ covers the milled head $e'$ to prevent an unauthorized person turning the spindle. Beneath the orifice $m$ is a receptacle $o$ fixed to the top of the vessel $a$.

In all cases when the compartment is filled to the desired height the float rises and the wheel turns delivering the petrol which flows through the orifice $b$ into the petrol tank, a counter on the spindle $e$ records the number of turns and so the amount of petrol passing through the vessel $a$ is measured.

In order to easily adjust the height to which the petrol must rise in the compartment $g$ before the lever $h$ is freed from the rod $l$, the rod $l$ is mounted in slides $u$ $u$ carrying racks $v$ $v$ which are operated by a spindle $w$ having pinions $w'$ for gearing with the racks $v$. By altering the position of the rod $l$ the amount of petrol required is altered.

What I claim is:—

1. Apparatus for measuring liquids consisting of a closed vessel having admission and delivery orifices, a measuring wheel in the closed vessel divided into compartments, a spindle on which the wheel is mounted, a float, a lever, one end of the lever being attached to the float, a projection adapted to engage with the other end of the lever, and means for adjusting the position of the projection.

2. Apparatus for measuring liquids consisting of a closed vessel having admission and delivery orifices, a measuring wheel in the closed vessel divided into compartments, a spindle on which it is mounted, a float in each compartment, levers pivoted to the wheel one end of each lever being attached to a float, a projection adapted to engage with the other ends of the levers, and means for adjusting the position of the projection.

EDMUND SEAL DONISTHORPE.

Witnesses:
LEONARD HAROLD BREWERTON,
F. PENFOLD.